United States Patent
Narang et al.

(10) Patent No.: US 9,913,223 B2
(45) Date of Patent: Mar. 6, 2018

(54) POWER ADAPTATION BASED ON ERROR RATE

(71) Applicant: APPLE INC., Cupertino, CA (US)

(72) Inventors: Mohit Narang, San Jose, CA (US); Peter M. Agboh, San Francisco, CA (US); Qiyang Wu, Cupertino, CA (US); Ruben Caballero, San Jose, CA (US); Vusthla Sunil Reddy, San Jose, CA (US); Xi Yang, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 118 days.

(21) Appl. No.: 14/746,133

(22) Filed: Jun. 22, 2015

(65) Prior Publication Data
US 2016/0374028 A1 Dec. 22, 2016

(51) Int. Cl.
| | |
|---|---|
| *G08C 17/00* | (2006.01) |
| *H04W 52/20* | (2009.01) |
| *H04W 4/00* | (2018.01) |
| *H04L 12/26* | (2006.01) |
| *H04W 52/24* | (2009.01) |
| *H04W 52/36* | (2009.01) |

(52) U.S. Cl.
CPC ......... *H04W 52/20* (2013.01); *H04L 43/0847* (2013.01); *H04W 4/008* (2013.01); *H04W 52/245* (2013.01); *H04W 52/246* (2013.01); *H04W 52/367* (2013.01)

(58) Field of Classification Search
None
See application file for complete search history.

(56) References Cited

U.S. PATENT DOCUMENTS

| | | | | |
|---|---|---|---|---|
| 8,792,533 | B2* | 7/2014 | Kizu | H04B 1/713 375/130 |
| 9,065,594 | B1* | 6/2015 | Husted | H04L 1/0002 |
| 2004/0048622 | A1* | 3/2004 | Witkowski | G07C 5/008 455/456.6 |
| 2004/0242258 | A1* | 12/2004 | Kim | H04W 52/245 455/522 |
| 2006/0171326 | A1* | 8/2006 | Durand | H04L 1/0001 370/252 |
| 2006/0188004 | A1* | 8/2006 | Kizu | H04B 1/715 375/132 |
| 2010/0008338 | A1* | 1/2010 | Tsfati | H04B 1/006 370/338 |
| 2010/0109789 | A1* | 5/2010 | Presti | H03C 1/00 332/149 |

(Continued)

*Primary Examiner* — Otis L Thompson, Jr.
(74) *Attorney, Agent, or Firm* — Fletcher Yoder PC

(57) ABSTRACT

A host device is configured to increase the power output by an internal amplifier of its wireless chipset in response to requests from a remote device coupled via a data link. Once the internal amplifier has reached its maximum power, the host device may determine the strength of the data link between it and the remote device. If the strength is low, it is an indication that further increases in signal power by the host device may have little effect on the link. If the signal strength from the remote device is sufficient, the host device determines an error rate. If the error rate is sufficiently low, the host device will not increase its signal output power. However, if the error rate is too high, the host device may increase power from its external amplifier to improve the error rate of the data link.

26 Claims, 7 Drawing Sheets

(56) References Cited

U.S. PATENT DOCUMENTS

| | | | | |
|---|---|---|---|---|
| 2010/0136928 A1* | 6/2010 | Rofougaran | ...... | H04W 52/0245 |
| | | | | 455/90.2 |
| 2010/0156624 A1* | 6/2010 | Hounsell | ................ | G08B 21/24 |
| | | | | 340/539.1 |
| 2010/0203838 A1* | 8/2010 | Ding | ................... | H04W 52/362 |
| | | | | 455/41.3 |
| 2011/0233280 A1* | 9/2011 | Bianconi | ............ | G06K 7/10881 |
| | | | | 235/462.46 |
| 2012/0071106 A1* | 3/2012 | Kadous | ................ | H04W 52/38 |
| | | | | 455/67.11 |
| 2012/0170514 A1* | 7/2012 | Lo | ...................... | H04W 52/262 |
| | | | | 370/328 |
| 2013/0278707 A1* | 10/2013 | Yang | ...................... | H04N 7/148 |
| | | | | 348/14.02 |
| 2014/0056170 A1* | 2/2014 | Mak | ...................... | H04W 24/08 |
| | | | | 370/253 |
| 2014/0140266 A1* | 5/2014 | Barrett | ................. | H04W 52/24 |
| | | | | 370/315 |

* cited by examiner

POWER ADAPTATION BASED ON ERROR RATE

BACKGROUND

The present disclosure relates generally to techniques for facilitating communication between two electronic devices and, more particularly, to techniques for controlling the power of communications signals between electronic devices, such as Bluetooth® enabled devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the marketplace today, there are a wide variety of electronic devices available for a wide variety of purposes. Such devices include cellular telephones, tablet computers, laptop computers, personal computers, televisions, headphones, Bluetooth® enabled watches, printers, and cameras, just to name a few. It is often desirable for one electronic device to communicate with one or more other electronic devices. Traditionally, such connections have been "hardwired", such that the devices had to be connected directly to one another by some sort of cabling or by cabling via a network interface. Such cabling is typically terminated by standardized connectors (e.g., USB, RS232, etc.) or by proprietary connectors, e.g. Apple's Lightning® connector, etc. Hence, not only does the cabling solution require a plethora of unsightly wires, it often requires specific types of cables and/or adaptors because of the wide variety of connectors and signaling schemes.

To address many of these concerns, various wireless technologies have become popular for facilitating communication between electronic devices. For example radio frequency (RF) technologies, such as WiFi (IEEE 802.11) and Bluetooth® (IEEE 802.15), are now commonly used by many electronic devices to facilitate communication without the need for cabling. Although such wireless interfaces address some of the problems with cabling, they are subject to their own disadvantages. For example, because wireless signals typically need to be amplified more than signals that travel on an actual conductor, electronic devices typically utilize more power when communicating wirelessly, thus reducing battery life.

In one particular example, two electronic devices may communicate with one another using Bluetooth®. In such situations, one device is typically the host, and the other device is typically considered a remote device. Once the devices are paired, the remote device will determine a received signal strength indication (RSSI), which is a measurement of the power present in the RF signal it receives from the host device. The higher the RSSI, the stronger the signal. When the remote device determines that the RSSI of the signal it receives falls below a certain level, it sends a signal to the host device to request that it increase the power of the signal it transmits. Typically, when a host device receives such a request, it increases the power of an internal amplifier that is typically part of its Bluetooth® chip set. While such internal amplifiers typically do not lead to undue power consumption by the host device, it may be undesirable to allow a remote device to dictate the output power of a host device in situations that could lead to undue power consumption by the host device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with the present techniques, certain devices, such as host devices, may include a wireless module that has an amplifier that is external to one or more of the wireless chip sets on the wireless module. In one example, a wireless module may include a Bluetooth® chipset having an internal amplifier, as well as an amplifier that is externally coupled to the Bluetooth® chipset to further increase the output power of the Bluetooth signal after the internal amplifier has reached its maximum power. In one embodiment, the host device is configured to increase the power output by the internal amplifier of its wireless chipset in response to requests from the remote device. However, once the internal amplifier has reached its maximum power, further requests for power increases from the remove device do not similarly lead to automatic power increases being delivered by the external amplifier of the host device. Rather, the host device determines the strength of the link between it and the remote device, by determining the RSSI of the signal it receives from the host device, for example. If the RSSI is too low, it is an indication that the signal power output by the remote device may not be sufficient to maintain the link and that any further increases in signal power by the host device will have little or no effect on the link. However, if the RSSI from the remote device is sufficient, the host device determines an error rate, such as an average packet error rate (PER), between it and the remote device. If the error rate is sufficiently low to maintain the link, then the host device will not further increase its signal output power. However, if the error rate is too high, the host device will turn on and/or increase power from its external amplifier to boost the power of its output signal and, thus, improve the error rate between it and the remote device. Utilizing such a technique, the host device does not unduly consume power by driving its external amplifier harder than required to maintain a sufficient communications link between it and the remote device.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
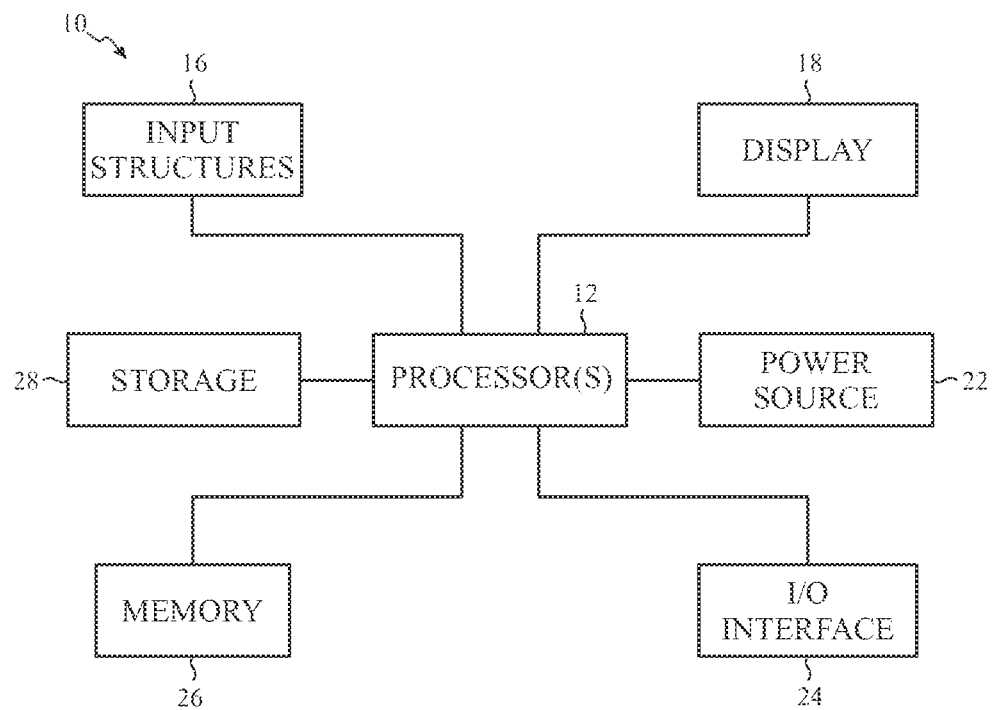
FIG. 1 is a schematic block diagram of an electronic device including display control circuitry, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed above, when electronic devices wirelessly communicate with one another, one of the devices may request that another device increase the output power of its wireless signal. In some situations, the request may cause the receiving device (after referred to as a host device) to increase its output power more than required to sufficiently maintain the link, and this can lead to undue power consumption and reduced battery life. For instance, if the power request from the remote device caused the host device to turn on an additional amplifier and increase its power more than required to sufficiently maintain the communications link, the host device may unduly consume power.

To address this concern, the techniques described herein may reduce power consumption of the host device. In one embodiment, the host device will increase output power of its wireless signal in response to requests from a remote device until the internal amplifier of its wireless chip set has reached its maximum level. Thereafter, the host device will monitor the communications link between it and the remote device to determine whether any further power increases may be desirable. For example, the host device may determine the RSSI of the signal it receives from the remote device to determine whether the signal strength of the remove device is sufficient to maintain the link. If not, it will not increase the output power of its signal since it would have little or no effect on the quality of the communications link. If so, however, the host device may determine the error rate of the communications link and whether that error rate is sufficiently low to adequately maintain the communications link. If so, it will not provide further power increases, such as by turning on or increasing the power of an amplifier external to the wireless chipset. If not, however, it may further increase signal output power, such as by providing power increases using the external amplifier, until the error rate is sufficiently low to adequately maintain the communications link.

Although the techniques described below use a Bluetooth communications link as an example, the techniques may apply to other types of wireless communications as well. For example, it may apply to other types of Bluetooth, such as Bluetooth Low Energy (BLE), WLAN, cellular, etc.

With these features in mind, a general description of suitable electronic devices that may use error based power adaptation is provided. Turning first to FIG. 1, an electronic device 10 according to an embodiment of the present disclosure may include, among other things, one or more processor(s) 12, memory 14, nonvolatile storage 16, a display 18 input structures 22, an input/output (I/O) interface 24 and a power source 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

Figure 2:
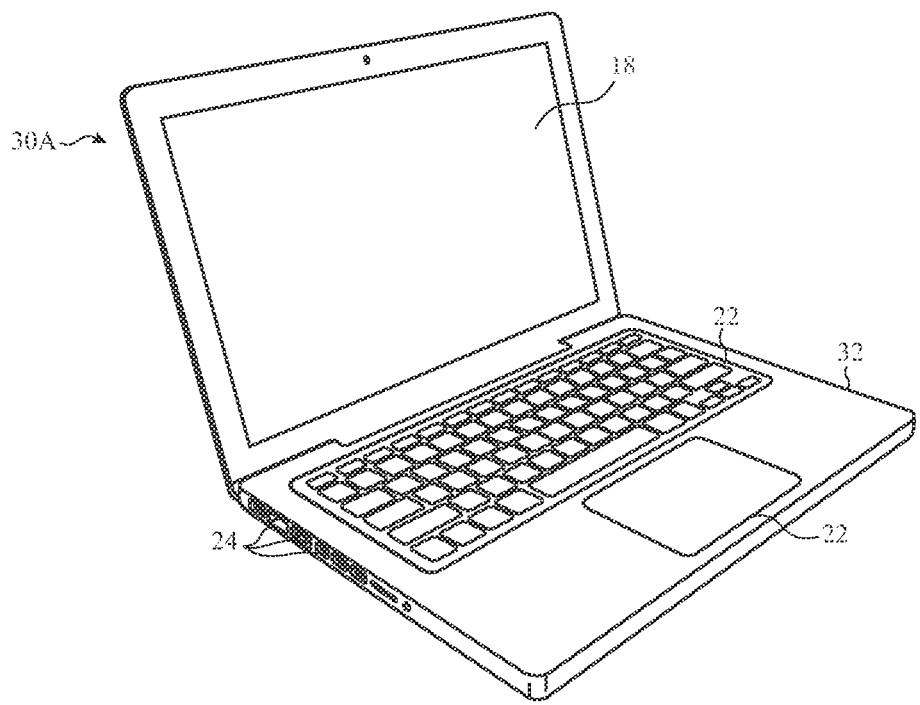
FIG. 2 is a perspective view of a notebook computer representing an embodiment of the electronic device of FIG. 1, in accordance with an embodiment.
Figure 3:
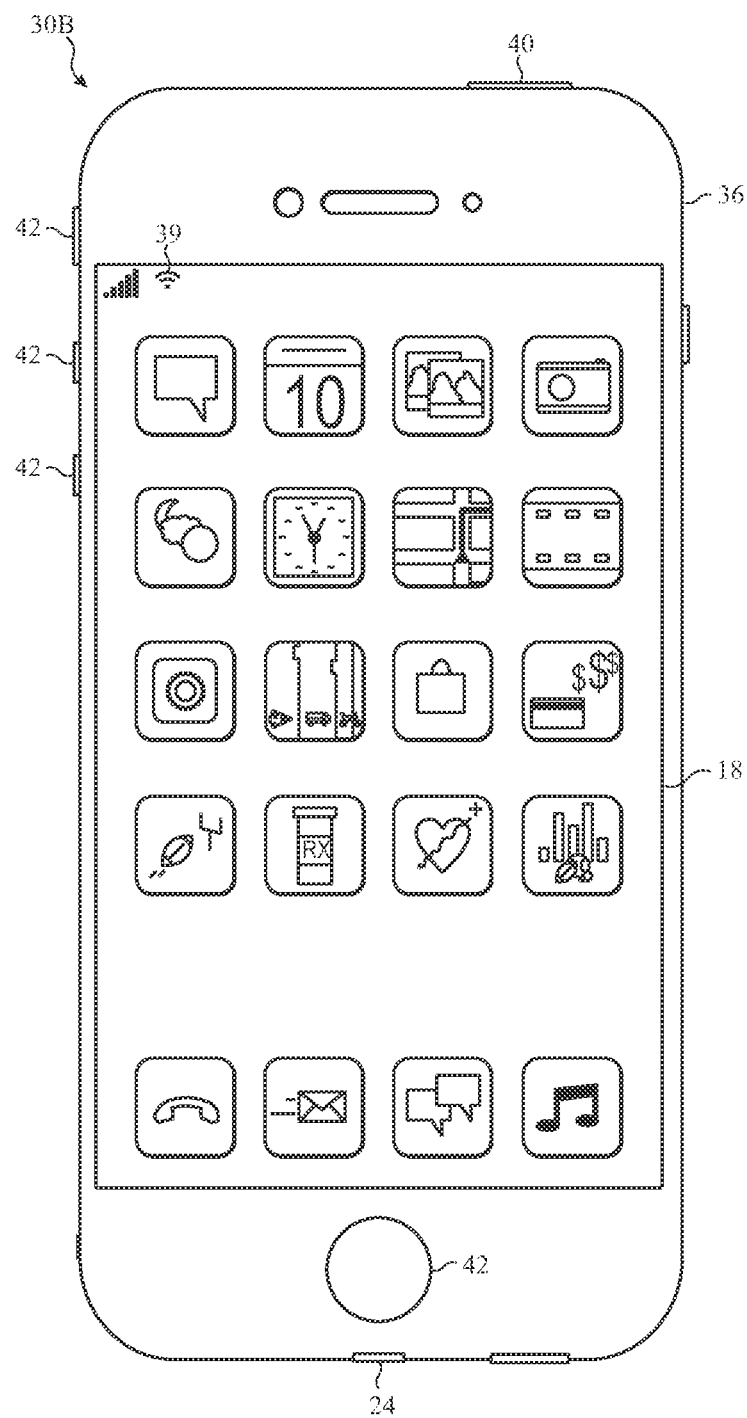
FIG. 3 is a front view of a hand-held device representing another embodiment of the electronic device of FIG. 1, in accordance with an embodiment.
Figure 4:
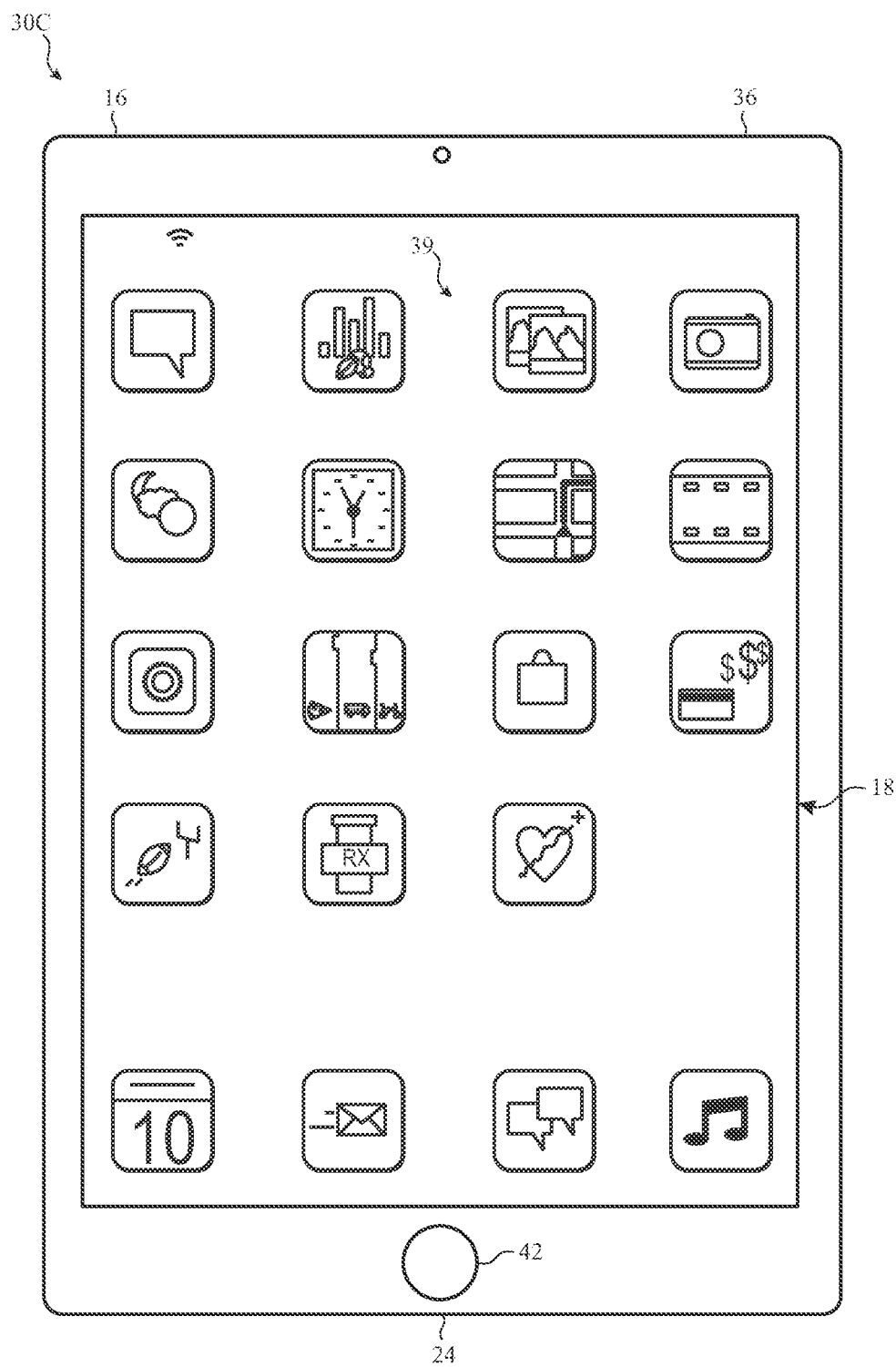
FIG. 4 is a front view of another hand-held device representing another embodiment of the electronic device of FIG. 1, in accordance with an embodiment.
Figure 5:
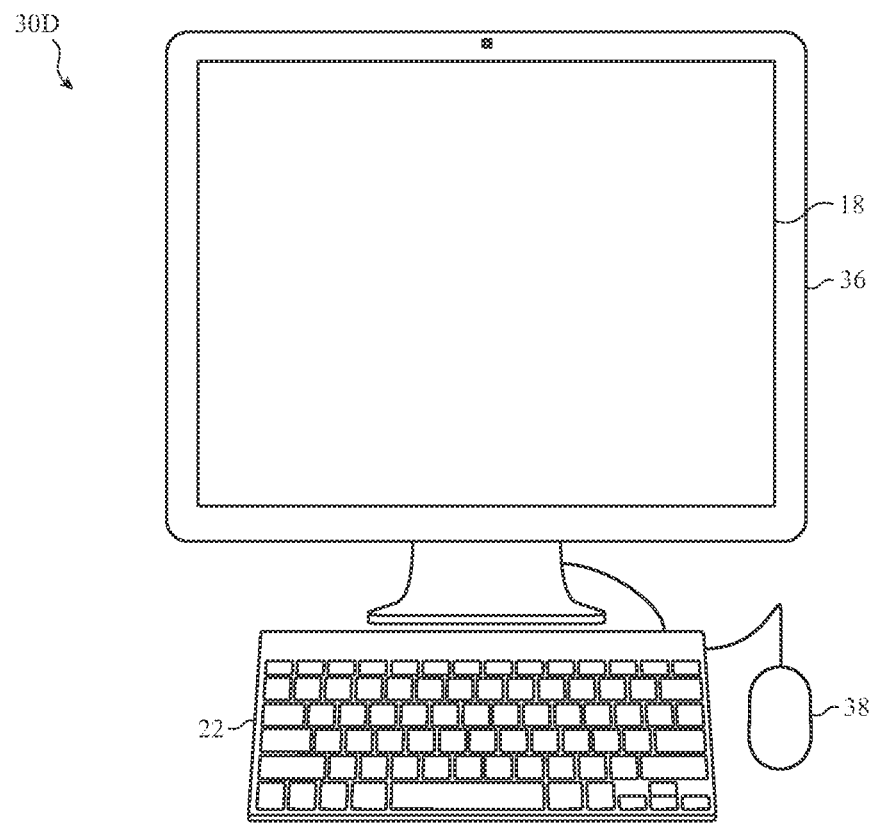
FIG. 5 is a front view of a desktop computer representing another embodiment of the electronic device of FIG. 1, in accordance with an embodiment.
Figure 6:
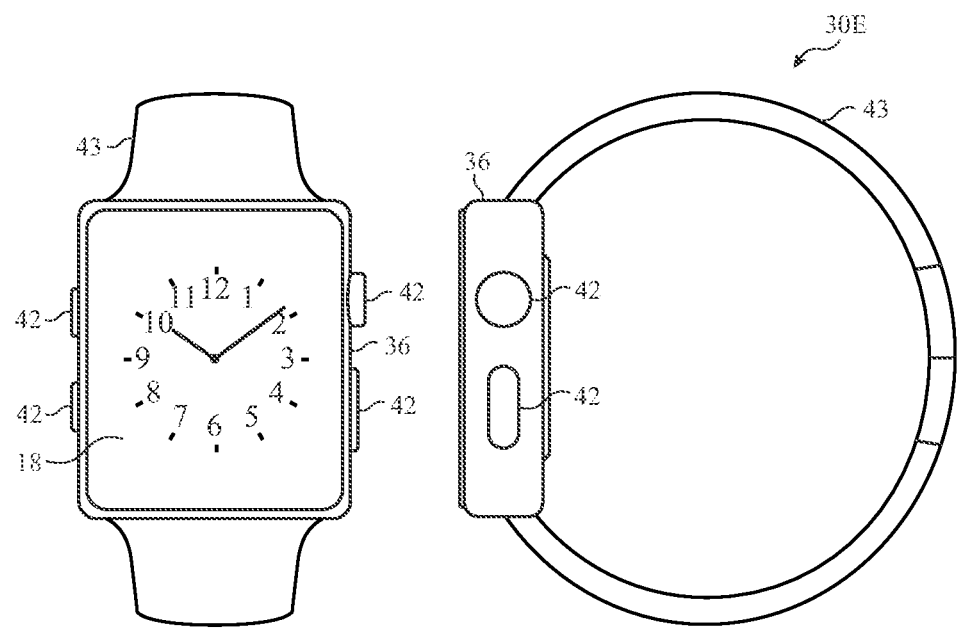
FIG. 6 is a front view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to perform various algorithms. Such programs or instructions, including those for executing the techniques described herein, executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., e.g., an operating system) encoded on such a computer program product may also include instructions that may be executed by the processor(s) 12 to enable the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., LED) displays, or some combination of LCD panels and LED panels.

The input structures 22 of the electronic device 10 may enable a user to interact with the electronic device 10 (e.g., e.g., pressing a button to increase or decrease a volume level). The I/O interface 24 may enable electronic device 10 to interface with various other electronic devices. The I/O interface 24 may include various types of ports that may be connected to cabling. These ports may include standardized and/or proprietary ports, such as USB, RS232, Apple's Lightning® connector, as well as one or more ports for a conducted RF link. The I/O interface 24 may also include, for example, interfaces for a personal area network (e.g., PAN), such as a Bluetooth network, for a local area network (e.g., LAN) or wireless local area network (e.g., WLAN), such as an 802.11x Wi-Fi network, and/or for a wide area network (e.g., WAN), such as a $3^{rd}$ generation (e.g., 3G) cellular network, $4^{th}$ generation (e.g., 4G) cellular network, or long term evolution (e.g., LTE) cellular network. The I/O interface 24 may also include interfaces for, for example, broadband fixed wireless access networks (e.g., WiMAX), mobile broadband Wireless networks (e.g., mobile WiMAX), and so forth.

As further illustrated, the electronic device 10 may include a power source 26. The power source 26 may include any suitable source of power, such as a rechargeable lithium polymer (e.g., Li-poly) battery and/or an alternating current (e.g., AC) power converter. The power source 26 may be removable, such as replaceable battery cell.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 22, and ports of the I/O interface 24. In one embodiment, the input structures 22 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 38 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a connector and protocol, such as the Lightning connector provided by Apple Inc., a universal serial bus (e.g., USB), one or more conducted RF connectors, or other connectors and protocols.

User input structures 40 and 42, in combination with the display 18, may allow a user to control the handheld device 30B. For example, the input structure 40 may activate or deactivate the handheld device 30B, one of the input structures 42 may navigate user interface to a home screen, a user-configurable application screen, and/or activate a voice-recognition feature of the handheld device 30B, while other of the input structures 42 may provide volume control, or may toggle between vibrate and ring modes. Additional input structures 42 may also include a microphone may obtain a user's voice for various voice-related features, and a speaker to allow for audio playback and/or certain phone capabilities. The input structures 42 may also include a headphone input to provide a connection to external speakers and/or headphones.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a Mac-Book®, or other similar device by Apple Inc. It should be noted that the computer 30D may also represent a personal computer (e.g., PC) by another manufacturer. A similar enclosure 36 may be provided to protect and enclose internal components of the computer 30D such as the dual-layer display 18. In certain embodiments, a user of the computer 30D may interact with the computer 30D using various peripheral input devices, such as the keyboard 22 or mouse 38, which may connect to the computer 30D via a wired and/or wireless I/O interface 24.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., e.g., pedometer, accelerometer, heart rate monitor), or other device by another manufacturer. The display 18 of the wearable electronic device 30E may include a touch screen (e.g., e.g., LCD, OLED display, active-matrix organic light emitting diode (e.g., AMOLED) display, and so forth), which may allow users to interact with a user interface of the wearable electronic device 30E.

Figure 7:
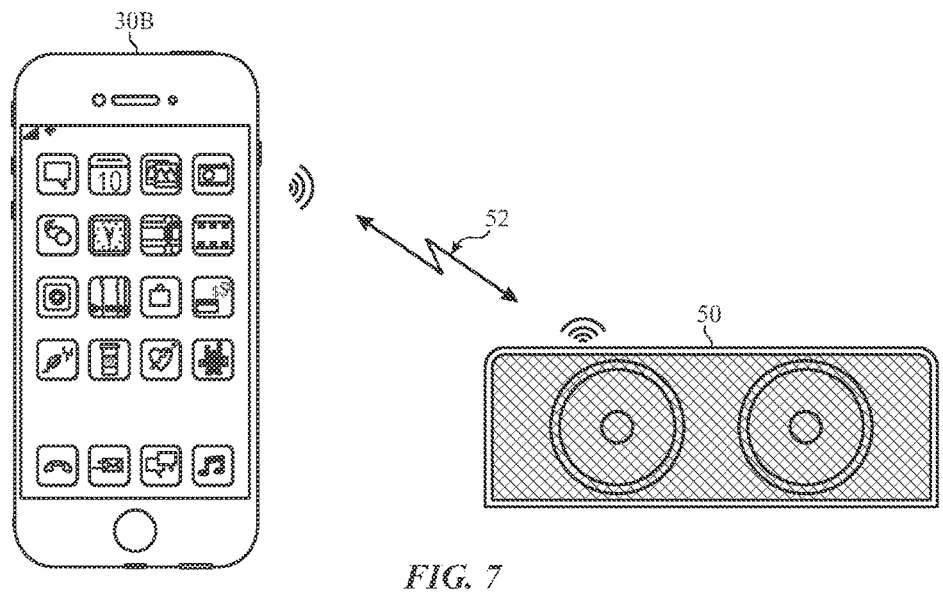
FIG. 7 is a diagram illustrating a host electronic device, such as a smart phone, communicating with a remote device, such as a wireless speaker, via a wireless link.
Figure 8:
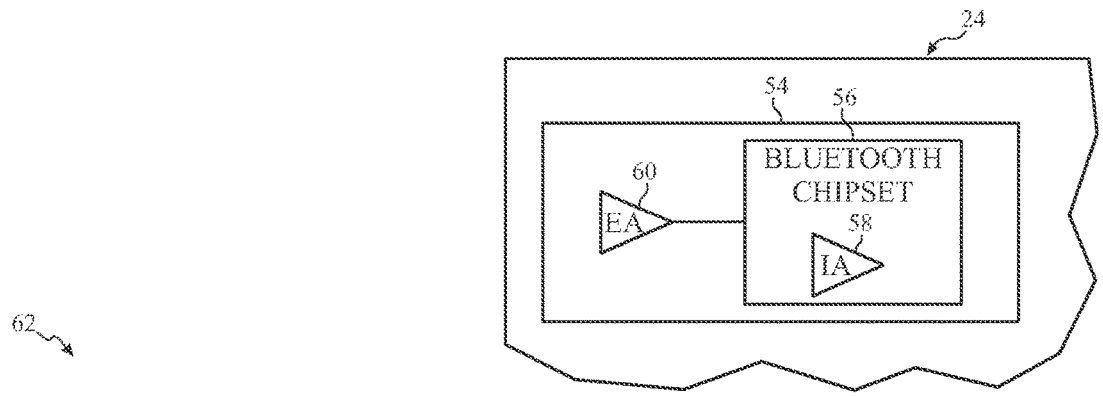
FIG. 8 is block diagram of a portion of the input/output (I/O) interface of FIG. 1, illustrating that the I/O interface may include, among other things, a wireless module having an external amplifier that may be used in conjunction with a wireless chipset having an internal amplifier.

As discussed previously, when electronic devices wirelessly communicate with one another, one of the devices may act as a host device while another of the devices may act as a remote device. An example of one such situation is illustrated in FIG. 7, which depicts a handheld device 30B acting as the host device. The host device 30B is wirelessly communicating with a remote device 50, here illustrated as a wireless speaker, via a communications link 52. As discussed previously, some communications protocols, such as Bluetooth®, operate in a manner where the remote device 50 will send a request to the host device 32B to increase its signal power if the RSSI at the remote device 52 falls below a certain level. In situations where the host device 30B includes an I/O interface 24 having a wireless module without any external amplifiers to further power the communications link 52, such requests from the remote device 50 to increase power will typically not result in undue power consumption by the host device 30B. However, in situations where the host device 30B includes such an I/O interface 24, such as that illustrated in FIG. 8, raising output power in response to every request from the remote device 50 could cause the host device 30B to unduly consume power. In this case, the wireless module 54 includes a wireless chipset, such as a Bluetooth® chipset 56 that includes its own internal amplifier 58. In addition, the wireless module 54 includes an external amplifier 60 that is coupled to the chipset 56 to further amplify the wireless signal produced by the chipset 56.

Because the external amplifier 60 can consume much more power than the internal amplifier 58 of the chipset 56, turning it on and increasing its power when it is not necessary to do so to maintain the communications link 52 can cause the host device 30B to unduly consume power. This is particularly problematic if the host device 30B is a battery powered device. One technique to address this concern is illustrated by the flowchart 62 in FIG. 9. According to this technique, if the RSSI at the remote device 50 is too low, it will send a request for more power to the host device 30B (Block 64). The host device 30B will check to see if the internal amplifier 58 is at its maximum output level (Block 66). If it is not, the host device 30B will increase the power output by the internal amplifier 58 based on the RSSI at the remote device 50 (Block 68). If so, however, the host device 30B will control its output power based on the error rate of the communications link 52 and the RSSI of the signal from the remote device 50 that is the received by the host device 30B (Block 69). As understood by those of ordinary skill in the art, this technique may be executed by any suitable data processing circuitry, including the processor(s) 12, a processor of the I/O interface 24, a processor of the wireless module 54 or chipset 56, or any combination thereof.

Figure 9:
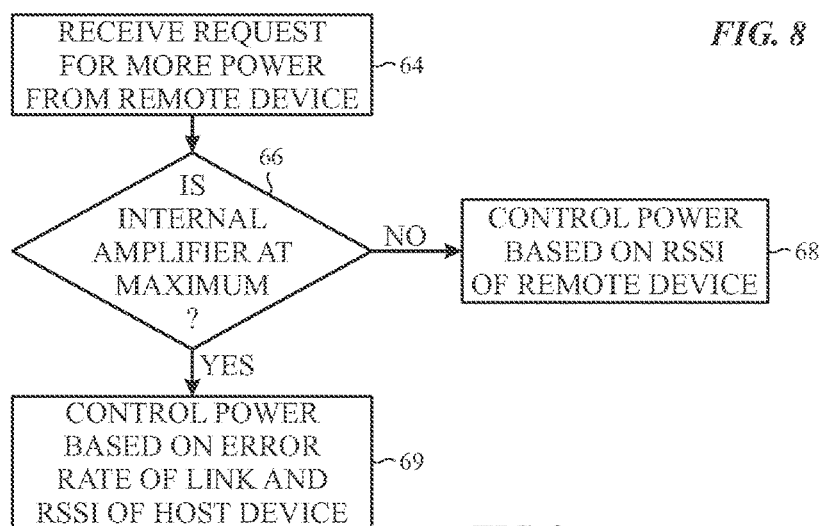
FIG. 9 is a flowchart demonstrating an example of a technique that an electronic device, such as the host device illustrated in FIG. 7, may use to control the output power of a wireless signal emitted by the electronic device.
Figure 10:
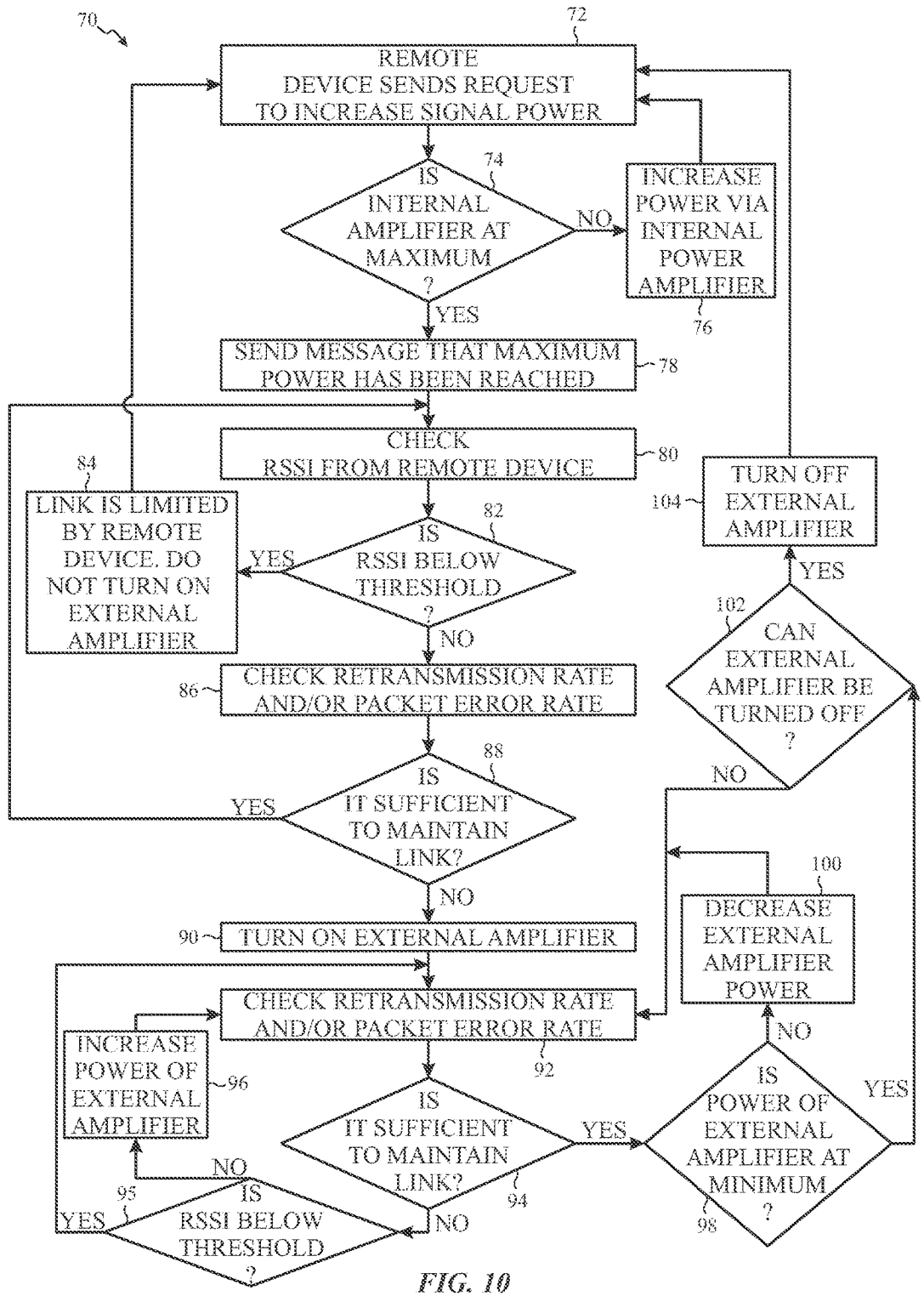
FIG. 10 is a flowchart illustrating one example of the technique illustrated in FIG. 9.

It should be appreciated that the technique discussed with respect to FIG. 9 may be executed in a variety of ways, and one way for executing this technique is illustrated by the flowchart 70 in FIG. 10. Here, the remote device 50 sends a request to the host device 30B to increase its signal power (Block 72). The host device 30B checks its internal amplifier 58 to determine whether it is at its maximum output level (Block 74). If not, the host device 30B increases power of its internal amplifier and waits to see if it will receive another request from the remote device 50 (Block 76). However, it the internal amplifier 58 is at its maximum power level, the host device 34 sends a message to the remote device 50 that maximum power has been reached (Block 78). This may have the effect of causing the remove device 50 to cease sending requests for more power to the host device 30B.

Next, the host device 30B determines whether any further increases in power will improve the communications link 52. One way it may do this is by checking the RSSI of the signal that it receives from the remote device 50 (Block 80). If the RSSI is below a certain threshold (Block 82), the host device 30B determines that the communications link 52 is limited by the signal output by the remote device 50 and, thus, does not turn on the external amplifier 60 (Block 84). However, if the RSSI of the signal from the remote device 50 is above the threshold, then it is possible that further power increases will improve the communications link 52. To make this determination, the host device 30B may check for the retransmission rate and/or packet error rate of the communications link 52 (Block 86). If the error rate is sufficient to maintain the communications link 52, the host device 30B will not turn on the external amplifier 60 or further increase power (Block 88). Rather, it will continue to monitor the communications link 52 as described above. If, however, the error rate is not sufficient to adequately maintain the communications link 52, the host device 30B will turn on the external amplifier 60 (Block 90). With the external amplifier 60 on, the host device 30B will again check the retransmission rate and/or package rate to determine whether it is sufficient to maintain the communications link 52 (Blocks 92 and 94). If not, it will again determine whether the RSSI from the remote device 50 is below a certain threshold (Block 95). If not, it will increase the power of the external amplifier 60 (Block 96). Otherwise, the communications link 52 is limited by the remote device 50, so the host device 30B will continue to check on the quality of the communications link 52 as described above.

Once the external amplifier 60 has been turned on so that it is providing additional power to the communications link 52, the host device 30B will determine whether it is able to turn off the external amplifier 60 or decrease its power while still maintaining an adequate communications link 52. Accordingly, if the error rate is sufficient to maintain the link, the host device 30B determines whether the external amplifier is at its minimal power level (Blocks 94 and 98). If not, it will decrease power from the external amplifier 60 and again check on the quality of the communications link 52 as described above (Block 100). However, if the external amplifier is at its minimum power level, the host device 30B will determine whether the external amplifier can be turned off (Blocks 98 and 102). If not, then the host 30B will continue to check on the quality of the communications link 52. If so, however, the host device 30B will turn off the external amplifier 60 and again wait for any requests to increase power from the remote device 50 (Blocks 104 and 72).

Figure 11:
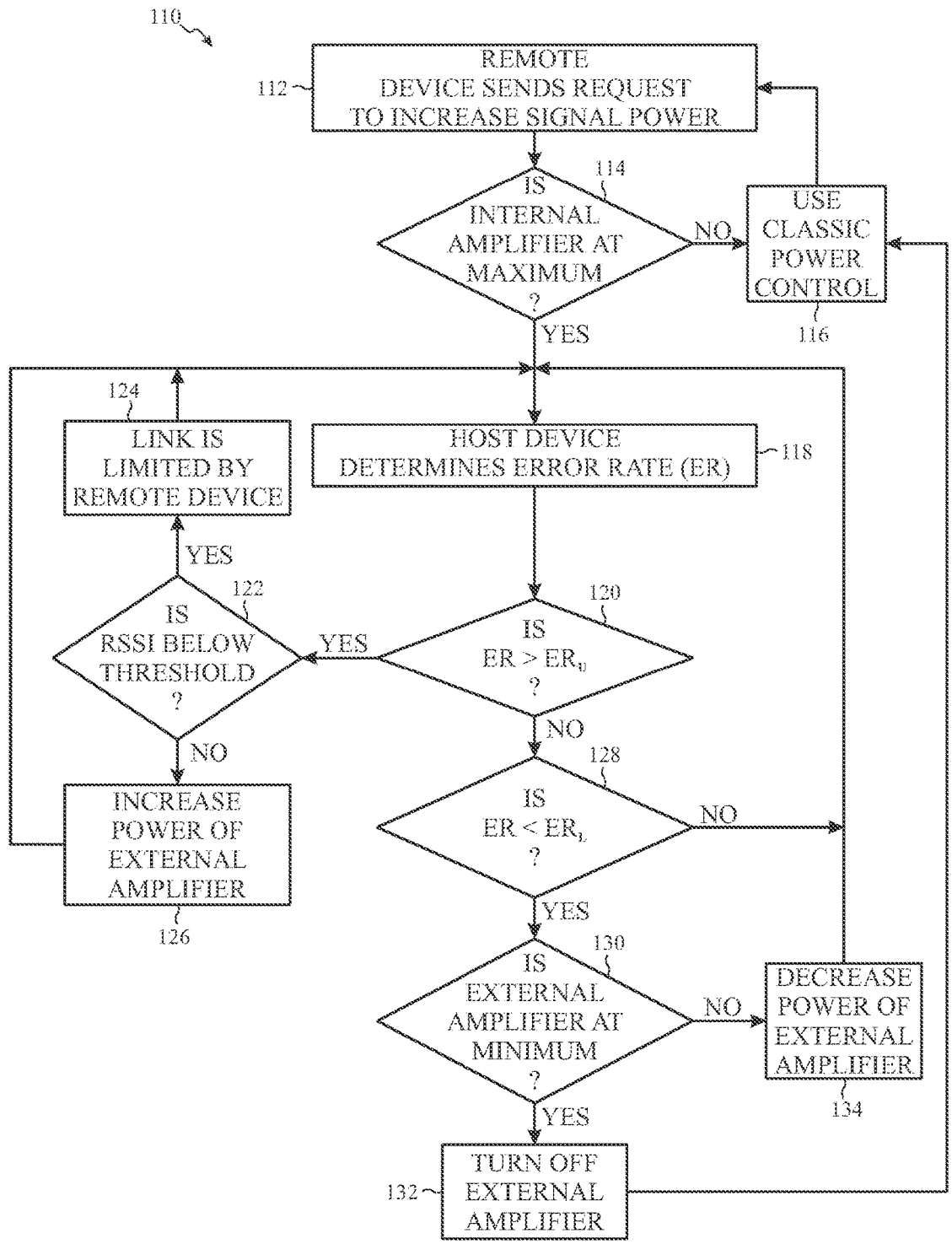
FIG. 11 is a flowchart illustrating another example of the technique illustrated in FIG. 9.

As mentioned above, there are a variety of ways to execute the technique set forth in FIG. 9, and another specific technique is illustrated by the flowchart 110 in FIG. 11. Here the remote device 50 sends a request to the host device 30B to increase its signal power (Block 112). When the host device 30B receives this request, it checks its internal amplifier 58 to determine whether it is at its maximum power level (Block 114). If not, the devices 30B and 50 will continue to operate under "classic power control" and the host device 30B will increase the power of its internal amplifier 58 (Block 116). However, if its internal amplifier is at its maximum power level, the host device 30B determines the error rate and/or retransmission rate of communications link 52 (Block 118). For example, the host device 30B may determine an average packet error rate over a given amount of time. If the error rate is greater than an upper boundary, the host device 30B checks to determine whether the RSSI of the signal that it received from the remote device 50 is below a threshold (Blocks 120 and 122). If the RSSI is too low, then the communications link 52 is limited by the remote device 50, so the host device 30B does not need to increase power using the external amplifier 60 (Block 124). However, if the signal strength from the remove device 50 is sufficient, the host device 30B will increase power using the external amplifier 60 (Block 126).

On the other hand, if the measured error rate is below the upper boundary, the host device 30B determines whether the error rate is below a lower boundary (Blocks 120 and 128). If not, then the host device 30B continues to monitor the quality of the communications link 52 as described above. However, if the measured error rate is below the lower boundary, this suggests that the power of the output signal from the host device 30B may be greater than needed to maintain the quality of the communications link 52. Accordingly, the host device 30B will check to see if the external amplifier 60 is at its minimum level (Block 130). If so, it will turn off the external amplifier 60 and the devices 30B and 50 will return to classic power control (Block 132 and 116). If not, the host 30B will decrease the power output by the external amplifier 60 and continue to monitor the communications link 52 as described above (Block 134).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device configured to communicate via a wireless communications link with a remote device, comprising:
    an input/output interface having a wireless module comprising:
        a wireless chipset configured to generate a radio frequency signal and having an internal amplifier configured to amplify the radio frequency signal; and
        an external amplifier operatively coupled to the wireless chipset and configured to further amplify the radio frequency signal; and
    a processor configured to:
        determine whether the internal amplifier is at a maximum amplification level in response to receiving a request from the remote device to increase power of the radio frequency signal;
        if the internal amplifier is not at the maximum amplification level, increase the amplification level of the internal amplifier in response to the request to increase power; and
        if the internal amplifier is at the maximum amplification level, determine an error rate of the communications link, determine a strength of a signal received by the electronic device from the remote device, and managing the external amplifier based at least in part on the error rate and on the signal strength, wherein managing the external amplifier comprises turning on, turning off, increasing the power, decreasing the power, or maintaining the power of the external amplifier.

2. The electronic device, as set forth in claim 1, wherein the wireless communications link comprises a Bluetooth communications link.

3. The electronic device, as set forth in claim 1, wherein the processor is configured to:
    determine if the error rate is above an upper boundary;
    if the error rate is above the upper boundary, determine whether the strength of the signal received by the electronic device from the remote is below a threshold;
    if the strength of the received signal is below the threshold, then not further amplify the radio frequency signal; and
    if the strength of the received signal is not below the threshold, then increase power of the external amplifier to further amplify the radio frequency signal.

4. The electronic device, as set forth in claim 3, wherein the processor is configured to:
    if the error rate is not above the upper boundary, determine if the error rate is below a lower boundary;
    if the error rate is below the lower boundary, then determine whether the amplification level of the external amplifier is at its minimum level;
    if it is at its minimum level, then turn off the external amplifier; and
    if it is not at its minimum level, then decrease power of the external amplifier.

5. The electronic device, as set forth in claim 1, wherein the processor is configured to:
    if the internal amplifier is at the maximum level, determine whether the strength of the signal received by the electronic device from the remote device is below a threshold;
    if the strength of the received signal is below the threshold, then not further amplify the radio frequency signal; and
    if the strength of the received signal is not below the threshold, then determine whether the error rate is sufficient to maintain the communications link;
    if so, then not further amplify the radio frequency signal;
    if not, then increase power of the external amplifier to further amplify the radio frequency signal.

6. The electronic device, as set forth in claim 5, wherein the processor is configured to:
    if the error rate is sufficient to maintain the communications link, then determine whether the amplification level of the external amplifier is at its minimum level;
    if it is at its minimum level, then turn off the external amplifier; and
    if it is not at its minimum level, then decrease power of the external amplifier.

7. A method for controlling the power of a radio frequency signal generated by an electronic device wirelessly communicating via a communications link with a remote device, the method comprising:
    receiving at the electronic device a request for more power from the remote device;
    when an internal amplifier of a wireless chipset generating the radio frequency signal of the electronic device is at a maximum amplification level, determining an error rate of the communications link and a strength of a signal received by the electronic device from the remote device; and
    when an internal amplifier of a wireless chipset generating the radio frequency signal of the electronic device is at a maximum amplification level, determining whether to increase a power of an amplifier of the electronic device external to the wireless chipset based at least in part on the error rate and on the signal strength.

8. The method, as set forth in claim 7, wherein the communications link comprises a Bluetooth communications link.

9. The method, as set forth in claim 7, wherein the step of determining whether to increase the power of the amplifier comprises:
   determining if the error rate is above an upper boundary;
   if the error rate is above the upper boundary, determining whether the strength of the signal received by the electronic device from the remote device is below a threshold;
   if the strength of the received signal is below the threshold, then not further amplifying the radio frequency signal; and
   if the strength of the received signal is not below the threshold, then increasing power of the external amplifier to further amplify the radio frequency signal.

10. The method, as set forth in claim 9, wherein the step of determining whether to increase the power of the amplifier comprises:
    if the error rate is not above the upper boundary, determining if the error rate is below a lower boundary;
    if the error rate is below the lower boundary, then determining whether the amplification level of the external amplifier is at its minimum level;
    if it is at its minimum level, then turning off the external amplifier; and
    if it is not at its minimum level, then decreasing power of the external amplifier.

11. The method, as set forth in claim 7, wherein the step of determining whether to increase the power of the amplifier comprises:
    if the internal amplifier is at the maximum level, determining whether the strength of the signal received by the electronic device from the remote device is below a threshold;
    if the strength of the received signal is below the threshold, then not further amplifying the radio frequency signal; and
    if the strength of the received signal is not below the threshold, then determining whether the error rate is sufficient to maintain the communications link;
    if so, then not further amplifying the radio frequency signal;
    if not, then increasing power of the external amplifier to further amplify the radio frequency signal.

12. The method, as set forth in claim 11, wherein the step of determining whether to increase the power of the amplifier comprises:
    if the error rate is sufficient to maintain the communications link, then determining whether the amplification level of the external amplifier is at its minimum level;
    if it is at its minimum level, then turning off the external amplifier; and
    if it is not at its minimum level, then decreasing power of the external amplifier.

13. A tangible, non-transitory computer readable medium having instructions that when executed by a processor of an electronic device in wireless communication with a remote device via a communications link cause the electronic device to:
    determine whether an internal amplifier of a wireless chipset generating a radio frequency signal of the electronic device is at a maximum amplification level in response to the electronic device receiving a request for more power from a remote device;
    if the internal amplifier is not at the maximum amplification level, increase the amplification level of the internal amplifier in response to the request for more power; and
    if the internal amplifier is at the maximum amplification level, determine an error rate of the communications link and a strength of a signal received by the electronic device from the remote device and determine whether to increase a power of an external amplifier of the electronic device in response to the request for more power based at least in part on the error rate and the strength of the received signal.

14. The medium, as set forth in claim 13, wherein the communications link comprises a Bluetooth communications link.

15. The medium, as set forth in claim 13, wherein the instructions cause the electronic device to:
    determine if the error rate is above an upper boundary;
    if the error rate is above the upper boundary, determine the strength of a signal received by the electronic device from the remote device and determining whether it is below a threshold;
    if the strength of the received signal is below the threshold, then not further amplify the radio frequency signal; and
    if the strength of the received signal is not below the threshold, then increase power of the external amplifier to further amplify the radio frequency signal.

16. The medium, as set forth in claim 15, wherein the instructions cause the electronic device to:
    if the error rate is not above the upper boundary, determine if the error rate is below a lower boundary;
    if the error rate is below the lower boundary, then determine whether the amplification level of the external amplifier is at its minimum level;
    if it is at its minimum level, then turn off the external amplifier; and
    if it is not at its minimum level, then decrease power of the external amplifier.

17. The medium, as set forth in claim 13, wherein the instructions cause the electronic device to:
    if the internal amplifier is at the maximum level, determine the strength of a signal received by the electronic device from the remote device and determine whether it is below a threshold;
    if the strength of the received signal is below the threshold, then not further amplify the radio frequency signal; and
    if the strength of the received signal is not below the threshold, then determine whether the error rate is sufficient to maintain the communications link;
    if so, then not further amplify the radio frequency signal;
    if not, then increase power of the external amplifier to further amplify the radio frequency signal.

18. The medium, as set forth in claim 17, wherein the instructions cause the electronic device to:
    if the error rate is sufficient to maintain the communications link, then determine whether the amplification level of the external amplifier is at a minimum level;
    if it is at the minimum level, then turn off the external amplifier; and
    if it is not at the minimum level, then decrease power of the external amplifier.

19. A method for controlling the power of a radio frequency signal generated by an electronic device wirelessly communicating via a communications link with a remote device, the method comprising:
    receiving at the electronic device a request for more power from the remote device;

determining whether an internal amplifier of a wireless chipset generating the radio frequency signal of the electronic device is at a maximum amplification level;

if not, increasing the amplification level of the internal amplifier in response to the request for more power;

if so, determining an error rate for the communications link and determining if the error rate is above an upper boundary;

if the error rate is above the upper boundary, determining the strength of a signal received by the electronic device from the remote device and determining whether it is below a threshold;

if the strength of the received signal is below the threshold, then not further amplifying the radio frequency signal;

if the strength of the received signal is not below the threshold, then increasing power of the external amplifier to further amplify the radio frequency signal;

if the error rate is not above the upper boundary, determining if the error rate is below a lower boundary;

if the error rate is below the lower boundary, then determining whether the amplification level of the external amplifier is at its minimum level;

if it is at its minimum level, then turning off the external amplifier; and if it is not at its minimum level, then decreasing power of the external amplifier.

20. The method, as set forth in claim 19, wherein the communications link comprises a Bluetooth communications link.

21. The method, as set forth in claim 19, wherein the error rate comprises an average error rate of the communications link.

22. The method, as set forth in claim 19, wherein the error rate comprises a retransmission rate of the communications link.

23. A system comprising an electronic device configured to communicate wirelessly with a remote device via a communications link, wherein the electronic device comprises a processor and a memory device comprising instructions that cause the processor to:

receive at the electronic device a request for more power from the remote device;

determine whether an internal amplifier of a wireless chipset generating the radio frequency signal of the electronic device is at a maximum amplification level;

if not, increase the amplification level of the internal amplifier in response to the request for more power;

if so, determine an error rate for the communications link and determining if the error rate is above an upper boundary;

if the error rate is above the upper boundary, determine the strength of a signal received by the electronic device from the remote device and determining whether it is below a threshold;

if the strength of the received signal is below the threshold, then not further amplify the radio frequency signal;

if the strength of the received signal is not below the threshold, then increase power of the external amplifier to further amplify the radio frequency signal;

if the error rate is not above the upper boundary, determine if the error rate is below a lower boundary;

if the error rate is below the lower boundary, then determine whether the amplification level of the external amplifier is at its minimum level;

if it is at its minimum level, then turn off the external amplifier; and if it is not at its minimum level, then decrease power of the external amplifier.

24. The method, as set forth in claim 23, wherein the communications link comprises a Bluetooth communications link.

25. The method, as set forth in claim 23, wherein the error rate comprises an average error rate of the communications link.

26. The method, as set forth in claim 23, wherein the error rate comprises a retransmission rate of the communications link.

* * * * *